UNITED STATES PATENT OFFICE.

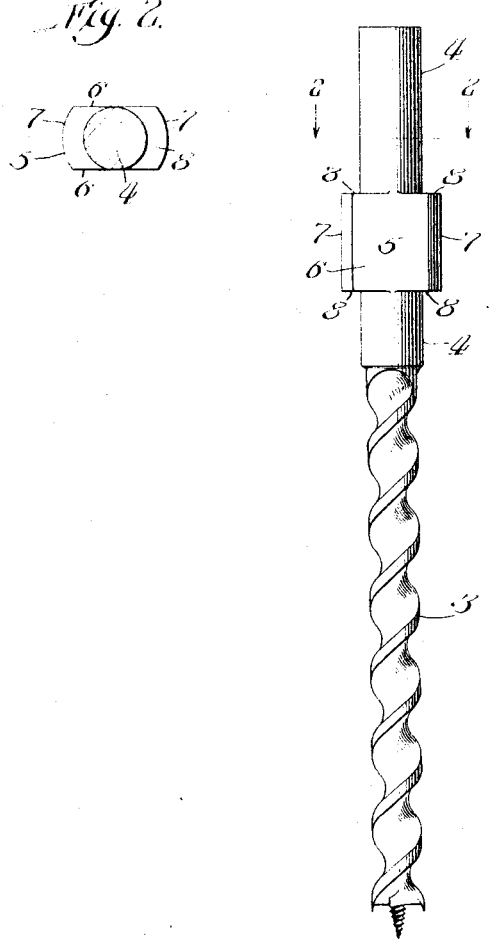

DANIEL W. EDWARDS, OF ROCKFORD, ILLINOIS, ASSIGNOR TO GREENLEE BROS. & COMPANY, OF ROCKFORD, ILLINOIS, A CORPORATION OF ILLINOIS.

TOOL.

1,105,553.  Specification of Letters Patent.  Patented July 28, 1914.

Application filed April 19, 1913. Serial No. 762,401.

*To all whom it may concern:*

Be it known that I, DANIEL W. EDWARDS, a citizen of the United States, residing at Rockford, in the county of Winnebago and State of Illinois, have invented certain new and useful Improvements in Tools, of which the following is a specification.

This invention relates to tools such as are adapted to be carried in a rotatable chuck.

The object of the invention is to construct a tool having a novel form of shank whereby the shank may be held fixedly in a working position in such chucks.

In the accompanying drawings, Figure 1 is a side view of my improved tool shank as applied to an auger bit. Fig. 2 is a plan section on the line 2—2 of Fig. 1.

My improved tool shank is illustrated in combination with a boring tool or auger bit 3. The shank of the tool 4 is cylindrical in shape and has formed thereon, intermediate its end and the bit portion, a head or enlargement 5. This head is formed with two parallel sides 6, flush with the sides of the shank, the ends 7 of the head being curved concentric with the shank. The shank is thus formed with two opposite lateral extensions, each extension having longitudinally opposite shoulders or abutments 8.

The shank of the tool, when in operation, will be inserted into the socket of a chuck adapted to carry a tool of this description. The cylindrical end shank portion of the tool is adapted to be located in a cylindrical bore in a chuck to hold the tool concentric with the chuck and from lateral displacement; the sides 6 are adapted to be contacted by sides of a chuck to hold the tool fixed rotatable therewith; and the shoulders 8 are to abut fixed surfaces in a chuck to hold the tool from displacement longitudinally in either direction. Thus it will be seen that the shank itself affords means for being retained fixed securely within a chuck, fixed against all such forces as would tend to displace it therefrom. Also, it is evident that the shape and size of the lateral extension of the shank may be varied to suit deviations in chuck construction without departing from the scope of my claim, but still retaining the essential holding surfaces for maintaining it concentric, from rotation and from longitudinal displacement.

I claim as my invention.

A boring tool having a cylindrical shank formed intermediate its ends with one or more lateral extensions which have longitudinally spaced abutments and have opposite sides substantially tangent with said shank sides.

In testimony whereof I have hereunto set my hand in presence of two subscribing witnesses.

DANIEL W. EDWARDS.

Witnesses:
E. BEHEL,
JOHN F. MCCANNA, Jr.